US005180906A

United States Patent [19]

Yamada

[11] Patent Number: 5,180,906

[45] Date of Patent: Jan. 19, 1993

[54] METHOD OF MANUFACTURING CARD

[75] Inventor: Shu Yamada, Tokyo, Japan

[73] Assignee: Kabushiki Kaisha Toshiba, Kawasaki, Japan

[21] Appl. No.: 562,676

[22] Filed: Aug. 3, 1990

[30] Foreign Application Priority Data

| | | | |
|---|---|---|---|
| Aug. 9, 1989 | [JP] | Japan | 1-204756 |
| Jan. 17, 1990 | [JP] | Japan | 2-6368 |
| Apr. 27, 1990 | [JP] | Japan | 2-110433 |
| Apr. 27, 1990 | [JP] | Japan | 2-110434 |

[51] Int. Cl.[5] ..... G06K 19/00

[52] U.S. Cl. ..... 235/487; 235/440; 235/488; 235/493; 355/20; 354/109

[58] Field of Search ..... 235/440, 487, 488, 493; 382/2; 355/20; 354/109

[56] References Cited

U.S. PATENT DOCUMENTS 4,712,909 12/1987 Oshikoshi ..... 235/487 X
4,811,408 3/1989 Goldman ..... 235/380
4,855,583 8/1989 Fraser et al. ..... 235/488

FOREIGN PATENT DOCUMENTS 63-120696 5/1988 Japan .

*Primary Examiner*—Harold Pitts
*Attorney, Agent, or Firm*—Oblon, Spivak, McClelland, Maier & Neustadt

[57] ABSTRACT

A method of manufacturing a card, comprising a first step of photographing objects and storing the photographed objects as image data, a second step of storing object data associated with the objects, and a third step of reading out desired image data from the image data and part of the object data corresponding to the desired image data. A step for synthesizing the desired image data and the part of the object data, and printing out the synthesized image and object data on a sheet is included.

14 Claims, 16 Drawing Sheets

METHOD OF MANUFACTURING CARD

BACKGROUND OF THE INVENTION

1. Field of the Invention

The present invention relates to a method of manufacturing a card and, more particularly, to a method of manufacturing a card such as an IC card with a photograph.

2. Description of the Related Art

An employee's portrait is adhered to an IC card with a photograph used for managing company employees, and employee data such as employee numbers and names are stored in the IC card.

Such an IC card is manufactured as follows. A face of each employee is photographed on a film camera, and a film unloaded from the camera is developed, printed, and enlarged A portrait of each employee is printed on a peelable print, and this peelable print is filed in a photograph register.

In this case, an employee number and name are also listed together with the peelable print in the photograph register.

The above operations are performed in units of employees.

On the other hand, an employee register is separately prepared. Data of the name, number, and date of birth of each employee are described in this employee register.

When an IC card for a predetermined employee is to be formed while the employees' photographs and their name list are managed, the photograph of this employee is searched in the photograph register. The searched photograph is adhered to a transparent sheet.

Data such as the name, number, and date of birth of this employee are also searched in the employee register and are typed on another sheet serving as an IC card base.

These two sheets are transferred to a card manufacturing process. In this process, these two sheets overlap still another sheet, interposing an IC module therebetween. These three sheets are heat-pressed to obtain an IC card.

The employee data such as the name, number, and the like of this employee are written in the IC module in the IC card by a data write-in unit.

Another card manufacturing method is described in Published Unexamined Japanese Patent Application No. 63-120696.

According to this card manufacturing method, an ID (identification) card is manufactured from laminated plastic sheets, and a portrait embedded in the plastic sheets.

In a card in which a portrait is embedded in plastic sheets, the portrait is separated from the plastic sheets when the plastic sheets receive an excessive force and are bent.

SUMMARY OF THE INVENTION

It is an object of the present invention to provide a method of manufacturing a card, which allows the manufacture of a high-strength card with excellent operability without any operation errors.

In order to achieve the above object of the present invention, there is provided a method of manufacturing a card, comprising the steps of photographing a plurality of objects and storing the photographed objects as image data, storing object data associated with the objects, reading out desired image data from the image date and part of the object data corresponding to the desired image data, and synthesizing the desired image data and the part of the object data on a base sheet, thereby performing data editing.

According to the above method, preparation of a photograph register and adhesion of photographs can be eliminated to facilitate the card manufacturing operations. In addition, when portraits of employees are collated with their data, image data are not erroneously identified with wrong employee data Input errors of employee data can also be minimized. Only one operator who operates both a data input personal computer and a data editing computer can manufacture a card. Furthermore, separation between a photograph and a card base can be prevented.

DESCRIPTION OF THE PREFERRED EMBODIMENTS

Preferred embodiments of the present invention will be described in detail with reference to the accompanying drawings.

Figure 1:
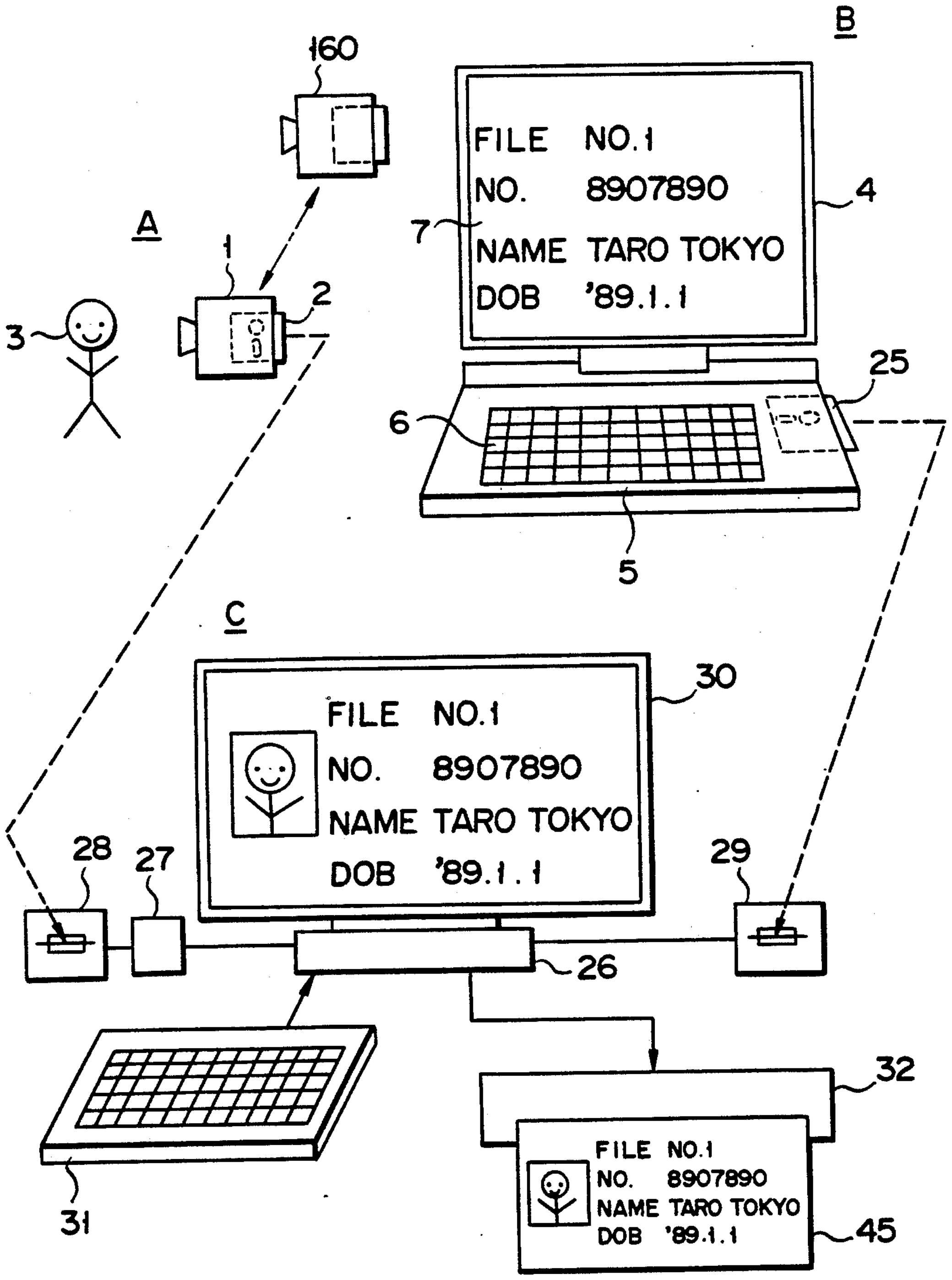
FIG. 1 is a view showing a manufacturing process according to the first embodiment of the present invention.

FIG. 1 shows the first embodiment of the present invention.

A card manufacturing method of this embodiment consists of a photographing process A, a data storage process B, and a data editing process C.

The photographing process A is performed using a floppy disk camera 1. This floppy disk camera 1 is an apparatus using a floppy disk as a recording medium.

The floppy disk camera 1 comprises an image pickup device such as a CCD image sensor.

The floppy disk camera 1 converts a light signal input to the image pickup device through an optical system such as a zoom lens into an electrical signal. The floppy disk camera 1 stores image data in a floppy disk incorporating in a magnetic disk.

The floppy disk camera 1 can pick up a still image. The floppy disk camera 1 can store several tens of image data in one floppy disk.

A reproduction scheme of the floppy disk camera 1 complies with a high-band scheme. A video signal of the floppy disk camera 1 complies with an NTSC (National Television System Committee) color scheme and an EIA (Electronics Industries Association) standard scheme.

The floppy disk camera 1 is connectable to, e.g., a VTR, a liquid crystal television set, and a monitor television set. The floppy disk camera 1 is connectable also to a wordprocessor or a personal computer through an interface.

In the photographing process A, an image data floppy disk 2 is inserted into the floppy disk camera 1 and stores a photographed object, e.g., portrait image data of an employee 3 as image data. Portraits of employees are photographed by the floppy disk camera 1, and data of these portraits are stored in the image data floppy disk 2.

The data storage process B comprises a data input personal computer 4. The data input personal computer 4 comprises a computer body 6 including a CPU, an internal memory, and a keyboard 5, and a plasma display unit 7.

Figure 2:
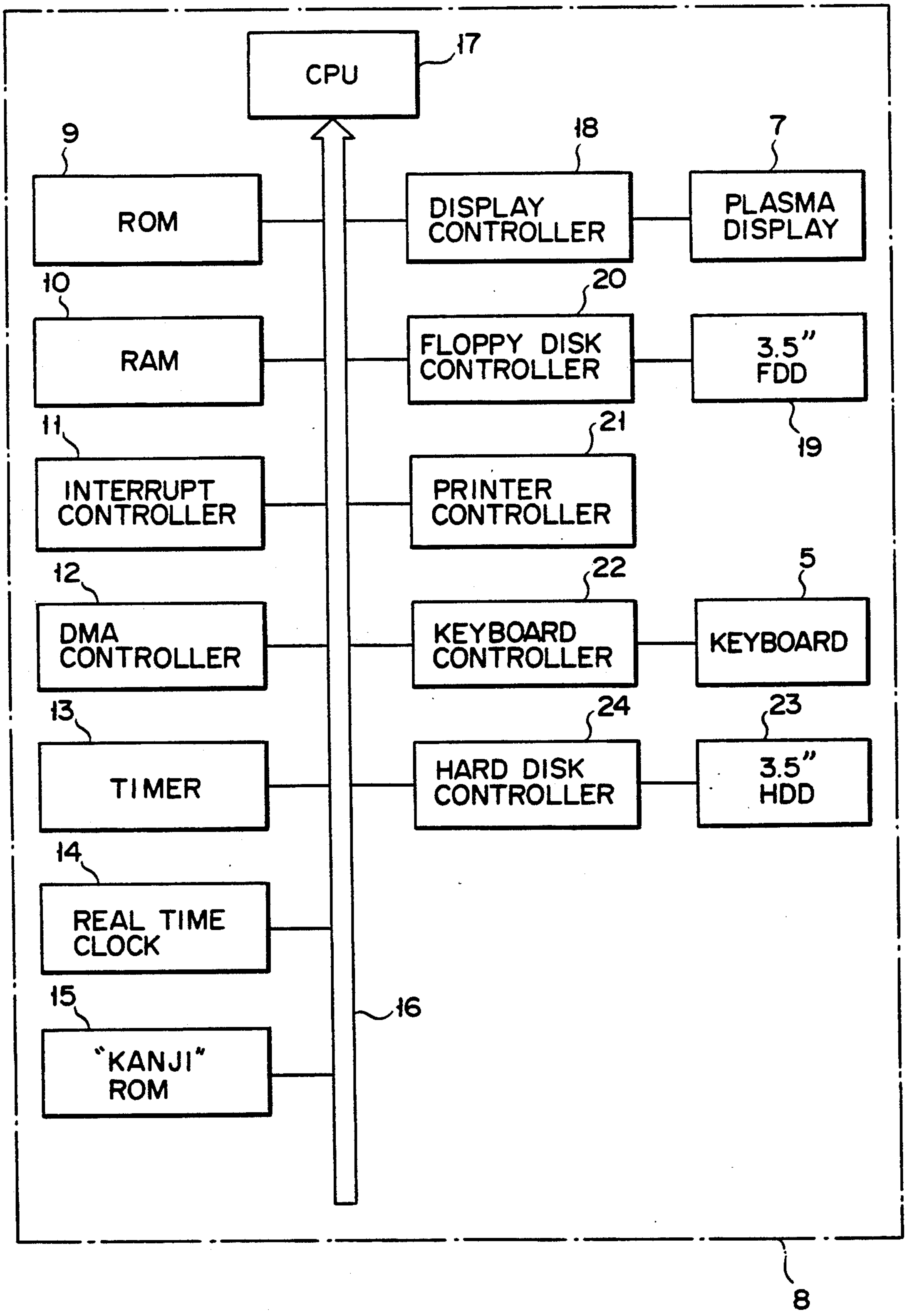
FIG. 2 is a block diagram showing a control section of a data input personal computer.

FIG. 2 shows an arrangement of a control section 8 of the data input personal computer 4. In this control section 8, a ROM 9, a RAM 10, an interrupt controller 11, a DMA controller 12, a timer 13, a real-time clock 14, and a kanji ROM 15 are connected to a CPU 17 through a bus 16.

A display controller 18 for controlling the plasma display unit 7, a floppy disk controller 20 for controlling a 3.5" floppy disk drive (3.5" FDD) 19, and a printer controller 21 are connected to the CPU 17 through the bus 16.

A keyboard controller 22 for controlling the keyboard 5 and a hard disk controller 24 for controlling a 3.5" hard disk drive (3.5" HDD) 23 are also connected to the CPU 17 through the bus 16.

In the data input personal computer 4, a data floppy disk 25 is inserted into the 3.5" FDD 19 arranged in the computer body 6.

In the data input personal computer 4, employee data as object data such as the name, number, and date of birth of each employee are input through the keyboard 5 and are stored in the data floppy disk 25.

The data common to all of the employees, such as agreement, calculation formula, etc. can be located in the employee data.

The employee data are stored in files of the data floppy disk 25 in units of employees. A database as a set of individual data of the employees is created in the data floppy disk 25.

Figure 3:
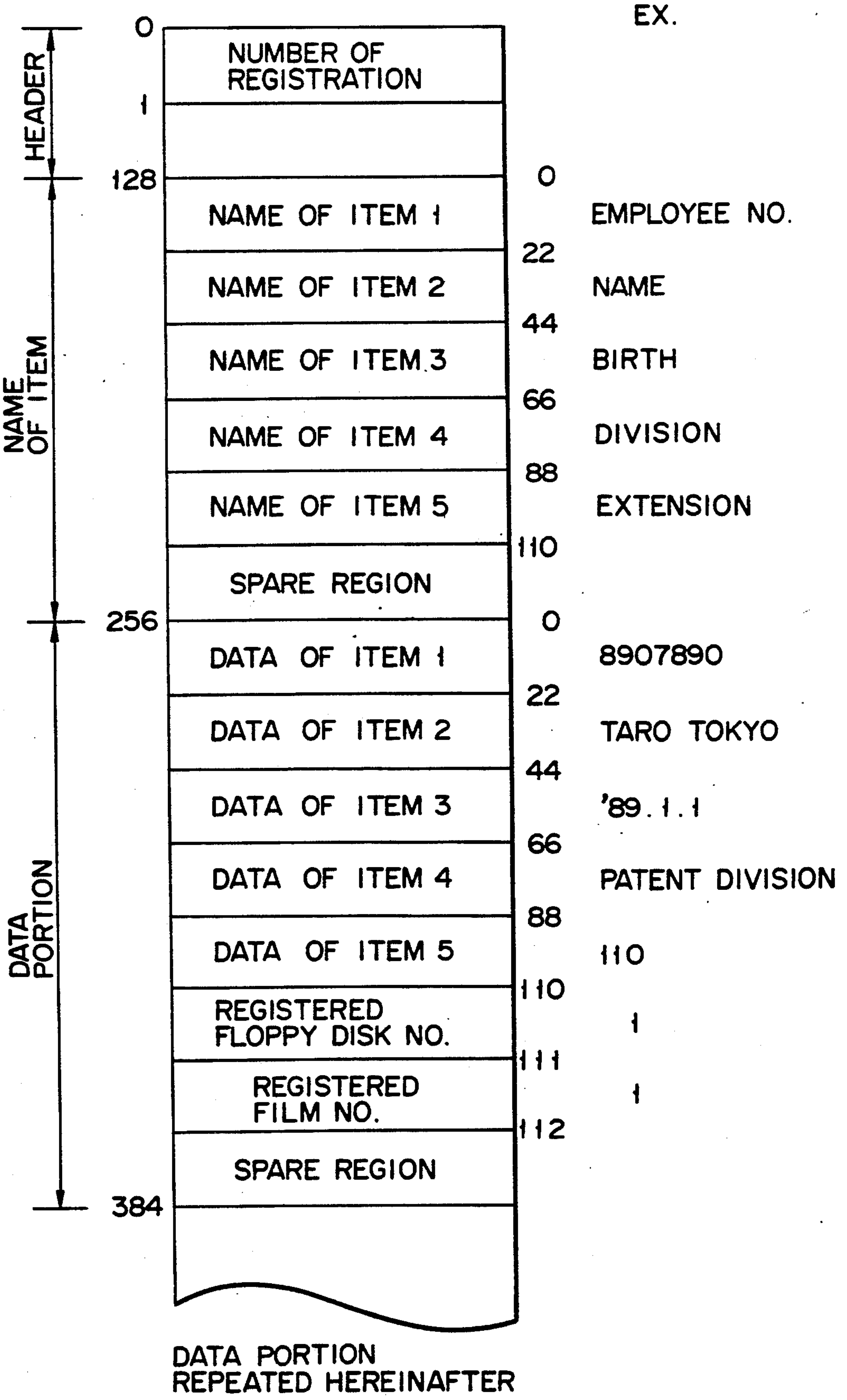
FIG. 3 is a data format of a data input floppy disk.

FIG. 3 shows a storage structure of the database created in the data floppy disk 25.

Of all bytes of the data floppy disk 25, first 128 bytes are used as a header for storing entries and the like, and second 128 bytes are used for storing names of items and the like.

The remaining storage area is divided in units of 128 bytes, and a plurality of data portions which store the employee data in units of employees are formed. Each data portion includes five item data areas corresponding to the respective names of items. A registration floppy disk number area and a registration film number area are formed in each item data area.

A total number of bytes of the data floppy disk 25 is represented by $256+128\times(2+n)$ [bytes], where n is the number of registered entries, i.e., the number of employees stored in one data floppy disk 25.

The data editing process C is performed using a data editing computer 26 shown in FIG. 1. This data editing computer 26 is connected to an image data readout unit 28 through an A/D converter 27. The data editing computer 26 also connects a data floppy disk drive 29, a display unit 30, a keyboard 31, and a printer 32.

A computer having the same control function as that of the data input personal computer 4 used in the data storage process B can be used as the data editing computer 26.

That is, it is possible to use a computer of the same type as that of the data input computer 4 as the data editing computer 26. In addition, the data input personal computer 4 may also serve as the data editing computer 26.

Figure 4:
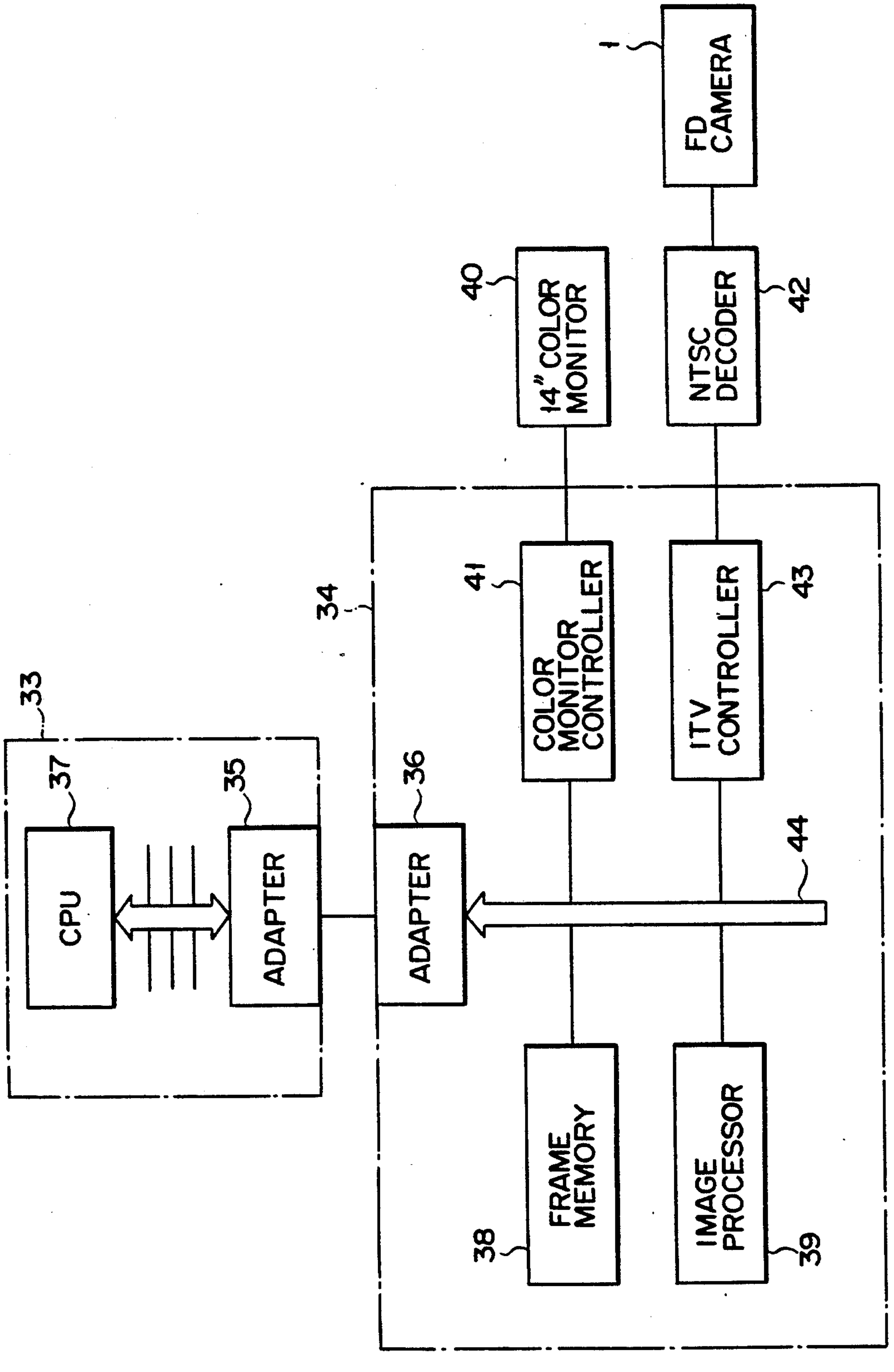
FIG. 4 is a block diagram showing a control section of a data editing computer and a control section of a display device.

FIG. 4 is a block diagram of the relationship between a control section 33 of the data editing computer 26 and a control section 34 of the image date readout unit 28.

In this embodiment, since a control section similar to the data input personal computer 4 is used as the control section 33 of the data editing computer 26, the control section 33 of the data editing computer 2 is schematically illustrated.

The control sections 33 and 34 are connected through adapters 35 and 36. The control section 34 of the image date readout unit 28 is connected to a CPU 37 in the control section 33 of the data editing computer 26.

In the control section 34 of the image date readout unit 28, a frame memory 38, an image processor 39, a color monitor controller 41 connected to a 14" color monitor 40, and an ITV (Industrial Television) controller 43 connected to a floppy disk camera 1 and an NTSC decoder 42 are connected to the adapter 36 through a bus 44.

The control section 34 of the image readout unit 28 input the signal outputted from the frame memory 38, the image processor 39, the color monitor controller 41, and the ITV controller 43, to the control section 33 of the data editing computer 26.

In the data editing process C, the data editing computer 26 receives various image data from the image data readout unit 28 and individual employee data from the data floppy disk drive 29. The data editing computer 26 displays image data and employee data on the display unit 30.

The data editing computer 26 synthesizes desired image and employee data displayed and selected on the display unit and lays out the synthesized data. The data editing computer 26 has print-out function for sending the image data and the employee data to the printer 32 and printing the sent data on a sheet 45 at the printer 32.

In the manufacturing method having the above processes, in the photographing process A, the portraits of the respective employees are picked up by the floppy disk camera 1, and image data of the portraits are stored in the image data floppy disk 2. The image data floppy disk 2 is unloaded from the floppy disk camera 1 and is inserted into the image data readout unit 28.

In the data storage process B, the employee data of the respective employees are stored in the data floppy disk 25 by the data input personal computer 4. In this case, film numbers of the image data floppy disk 2 are also stored in the data floppy disk 25.

That is, as indicated on to the right side in FIG. 3, e.g., "employee number", "name", "birth" (date of birth), "division", and "extension" are stored in the data floppy disk 25 as item name of the names of first to fifth items. The first to fifth item data of the first data portion store "8907890", "TARO TOKYO", "89.1.1", "patent division", "110", "1", and "1". Individual employee data are similarly stored from the second data portion in units of 128 bytes.

The data floppy disk 25 is then unloaded from the data input personal computer 4 and is inserted into the data floppy disk drive 29.

Figure 5:
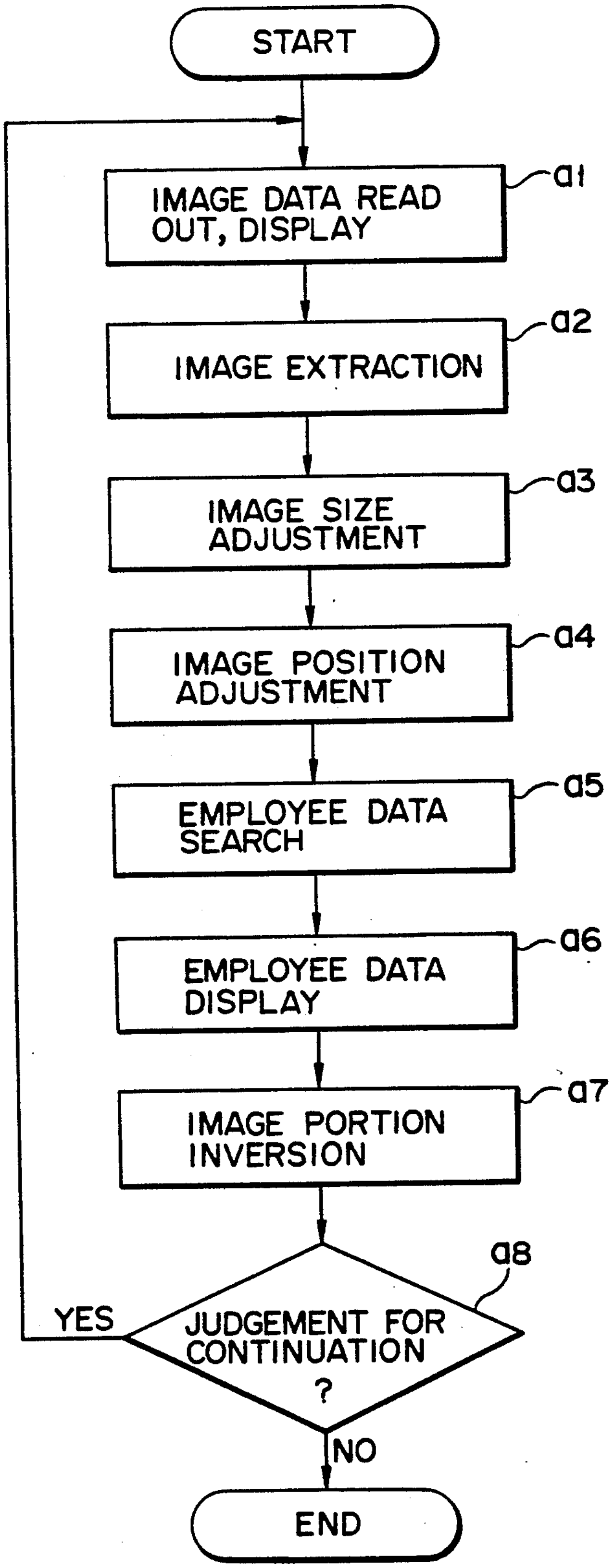
FIG. 5 is a flow chart showing data synthesis processing in the data editing computer.

FIG. 5 shows a flow of data synthesis performed in the data editing process C.

In the data editing process C, when an editing command is input from the keyboard 31, the data editing computer 26 reads out image data from the image data readout unit 28 (step a1).

Image extraction (step a2), size adjustment (step a3), and position adjustment (step a4) are performed. The data editing computer 26 reads out employee data from the data floppy disk drive 29 (steps a5 and a6).

Assume that an IC card of an employee having an employee number "8907890" is manufactured. The data editing computer 26 reads the first image data of the plurality of image data stored in the image data floppy disk 2 and loads the first file corresponding to the image data from a plurality of employee data stored in the data floppy disk 25. The data editing computer 26 synthesizes the first image data and the first employee data.

When the data editing computer 26 reproduces n image data of the image data floppy disk as in the case of the first image data, it loads the corresponding n files from the individual data.

The data editing computer 26 synthesizes n image data and n employee data.

When the image data displayed on the display unit 30 does not coincide with the employee data, the data editing computer 26 judges the continuation (step a8). The data editing computer 26 selects and updates the data read out from the image data readout unit 28 and the data floppy disk drive 29 in accordance with an instruction input at the keyboard 31.

When image data coincides with employee data, data synthesis processing is ended, and the data editing computer 26 sends both the data to the printer 32. The data editing computer 26 causes the printer 32 to print out the image and employee data at predetermined positions of the sheet 45.

In this manner, a card having specific employee data and his/her portrait can be obtained.

In the first embodiment described above, a plurality of employees are photographed, and their portraits are stored as image data. Employee data of the respective employees are stored independently of the image data. Desired image and employee data of these image and employee data ar synthesized under the control of the computer, and the synthesized data is printed out on the sheet 45.

As compared with the conventional method which requires formation of a photograph register and adhesion of a photograph with a paste, the card manufacturing operations can be greatly facilitated. No operation errors occur when a portrait of an employee is collated with employee data.

In addition, input errors for employee data can be greatly reduced. A card can be manufactured by one operator who operates the data input personal computer 4 and the data editing computer 26.

Figure 6:
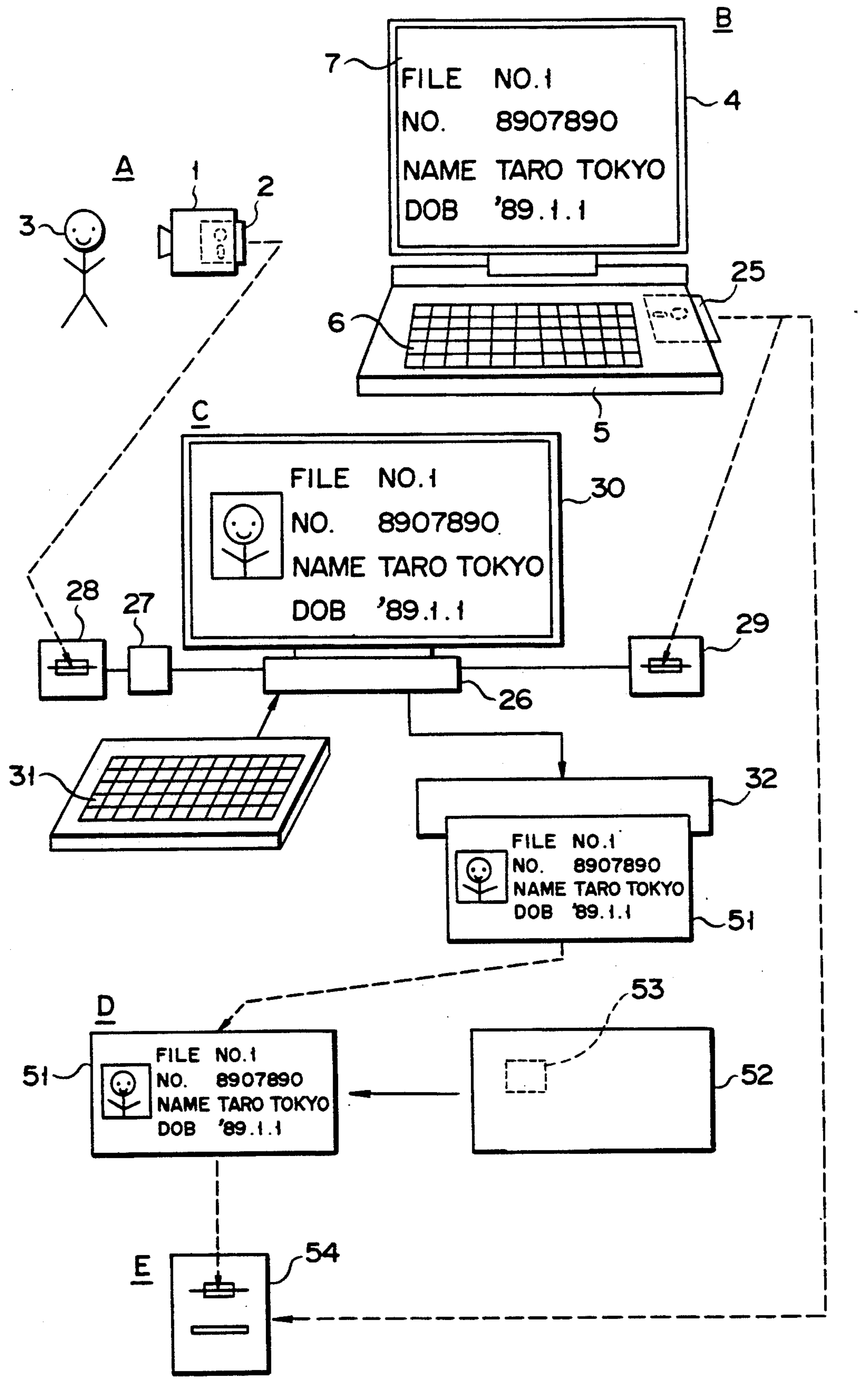
FIG. 6 is a view showing a manufacturing process according to the second embodiment of the present invention.

The second embodiment of the present invention will be described with reference to FIGS. 6 and 7. The same reference numerals as in the first embodiment denote the same parts in the second embodiment, and a detailed description thereof will be omitted.

This card manufacturing method consists of a photographing process A, a data storage process B, a data editing process C, a card forming process D, and a data write-in process E. The operations from the photographing process A to the data editing process C are the same as those in the first embodiment. In the data editing process C, a printer 32 prints out image data and employee data on a white polyvinyl chloride sheet 51.

The white polyvinyl chloride sheet 51 printed with the image data and the employee data is conveyed to the card forming process D. In the card forming process D, the white polyvinyl chloride sheet 51 is placed on a polyvinyl chloride sheet 52 so as to interpose an IC module 53 serving as a data storage medium therebetween. The white polyvinyl chloride sheet 51 and the polyvinyl chloride sheet 52 are heat-pressed to form an integral body.

The white polyvinyl chloride sheet 51 may be constituted by a plurality of sheets including the IC module 53.

The formed IC card is transferred to the data write-in process E. The data write-in process E is performed using a data write-in unit 54.

Figure 7:
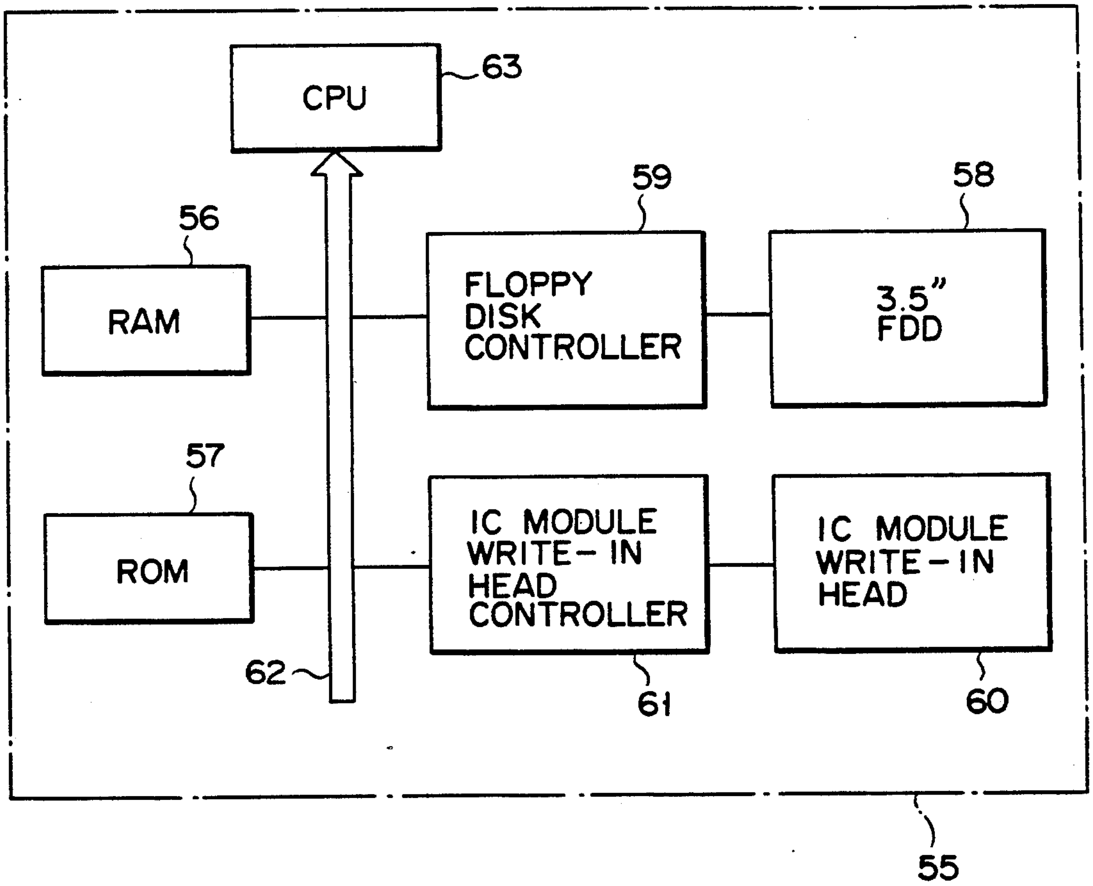
FIG. 7 is a block diagram showing a control section of a data write-in unit.

FIG. 7 shows an arrangement of a control section 55 of the data write-in unit 54.

In the control section 55, a RAM 56, a ROM 57, a floppy disk controller 59 connected to a 3.5" FDD 58, and an IC module write-in head controller 61 connected to an IC module write-in head 60 are connected to a CPU 63 through a bus 62.

The data write-in unit 54 receives a IC card formed in the card forming process D and a data floppy disk 25 prepared in the data storage process B. Employee data corresponding to the employee number "8907890" is read out from the data floppy disk 25 and is stored in the IC card memory.

An IC card on which the portrait and employee data which correspond to the employee number "8907890" are printed and which stores the corresponding employee data is formed.

In the second embodiment described above, a plurality of employees are photographed, and their portraits are stored as image data. The employee data of the respective employees are stored independently of the image data. Desired image and employee data of these image and employee data are synthesized. under the control of the computer, and the synthesized data is printed out on the white polyvinyl chloride sheet 51.

The IC module is sandwiched between the white polyvinyl chloride sheet 51 and another polyvinyl chloride sheet to form an IC card with a photograph and characters. Employee data is stored in the corresponding IC module.

An IC card with a photograph and characters can be formed with the same effect as in the first embodiment.

Figure 8:
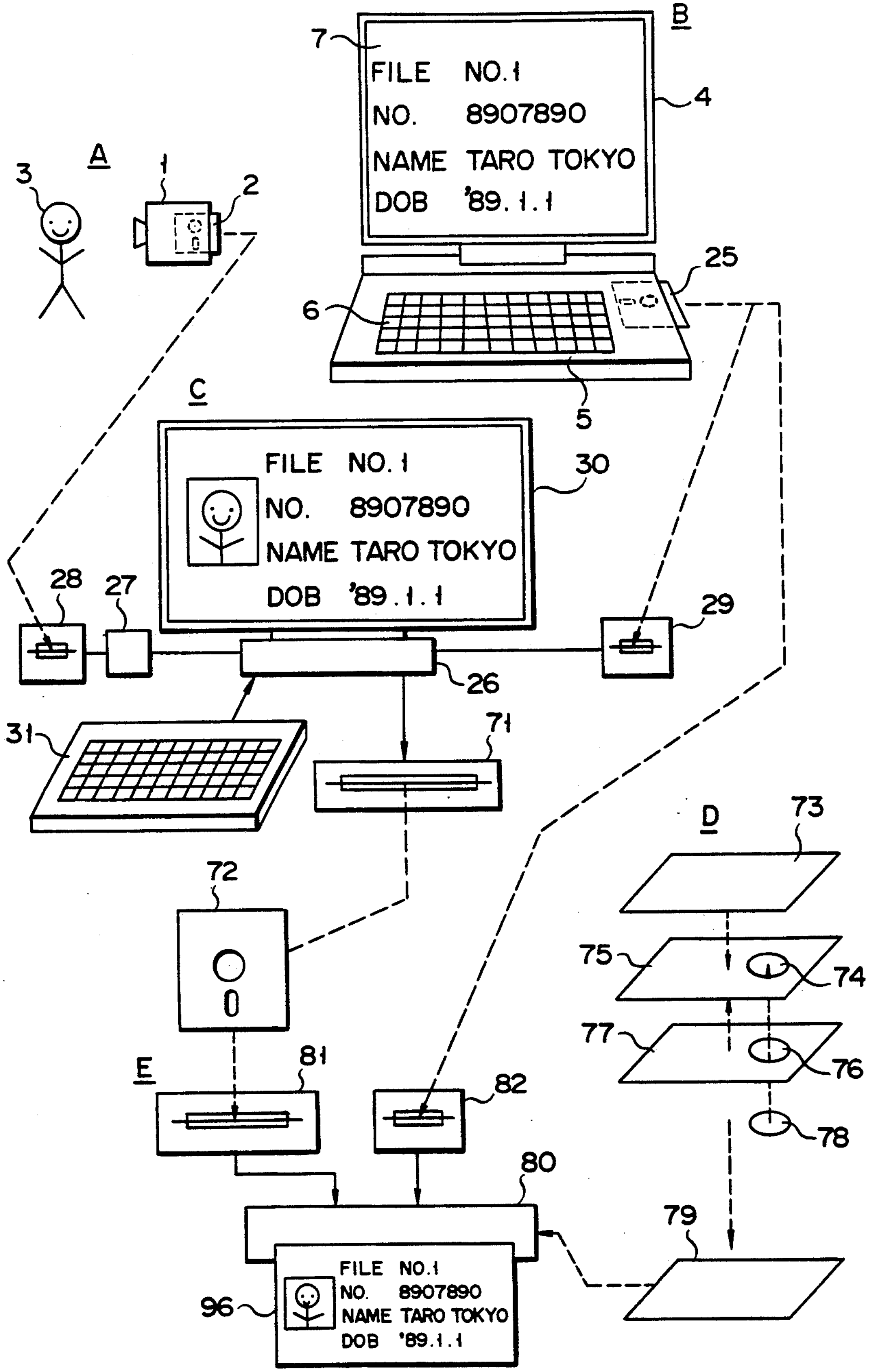
FIG. 8 is a view showing a manufacturing process according to the third embodiment of the present invention.

The third embodiment of the present invention will be described with reference to FIG. 8. The same reference numerals as in the first and second embodiments denote the same parts in the third embodiment, and a detailed description thereof will be omitted.

A card manufacturing method of this embodiment consists of a photographing process A, a data storage process B, a data editing process C, a white card forming process D, and a data printing/storing process E. Operations from the photographing process A to the data editing process C are the same as those of the first embodiment.

The data editing process C includes data editing computer 26 and a write-in unit 71.

Figure 9:
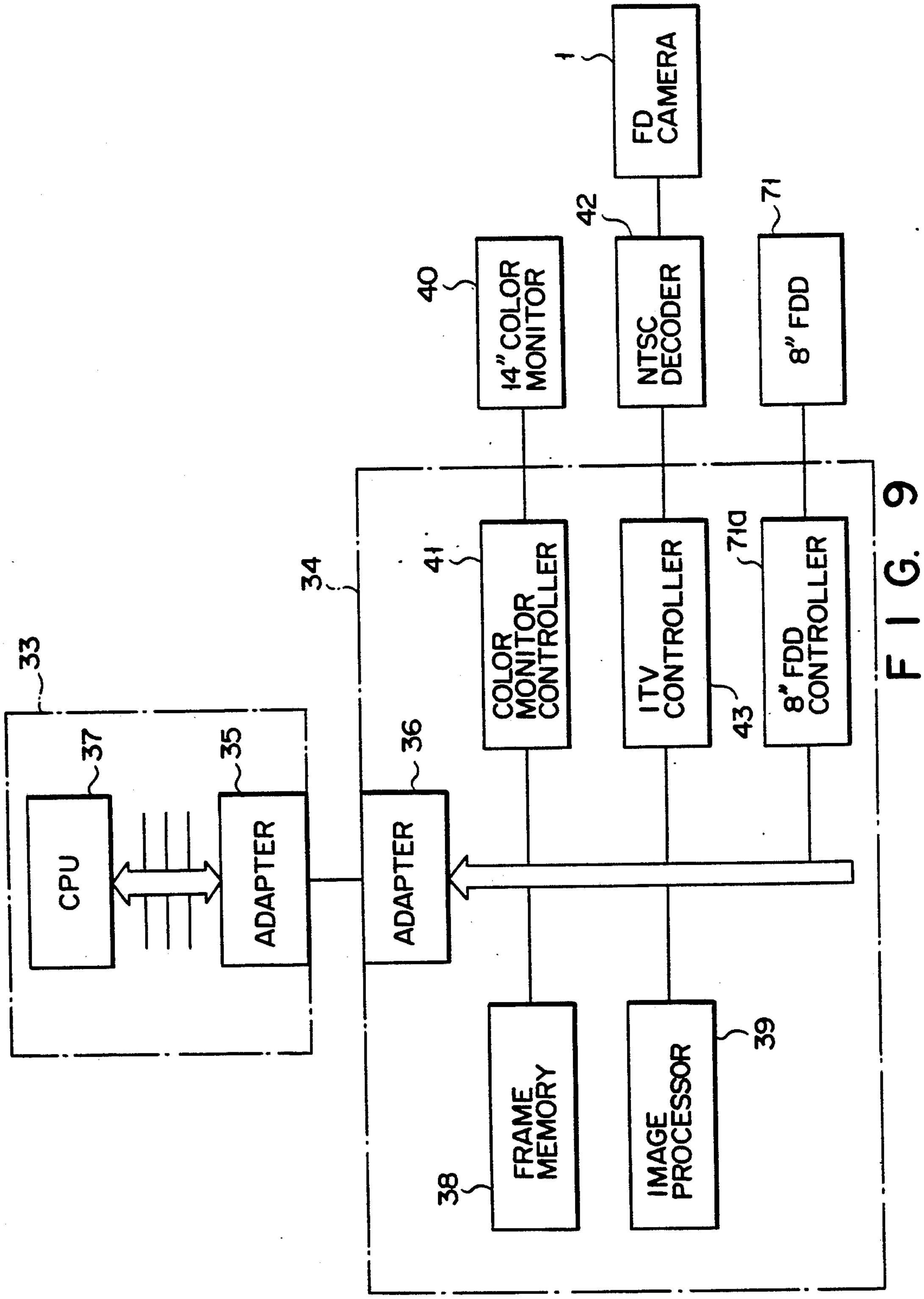
FIG. 9 is a block diagram showing an arrangement of a control section of a data write-in unit.

FIG. 9 shows a connecting relationship of a data write-in unit 71.

The data write-in unit 71 is connected to an 8" FDD controller 71a and is connected to a CPU 37 in a control section 33 of the editing computer 26 through a control section 34 in a display unit 30.

The data write-in unit 71 performs write access of data in the 8" floppy disk. A data write-in unit obtained by including the same control section as the control section 55 of the data write-in unit 54 of the second embodiment can be used as the data write-in unit 71.

The data processing computer 26 has a function of causing the data write-in unit 71 to write the synthesized image and employee data as surface printing data in a surface printing floppy disk 72 upon completion of data synthesis processing.

In the white card forming process D, a white polyvinyl chloride sheet 73, a white polyvinyl chloride sheet 75 having a hole 74, and a white polyvinyl chloride sheet 77 having a hole 76 are pressed while an IC module 78 serving as a data storage medium is inserted into the holes 74 and 76. A white card 79 having the IC module 78 is formed.

The data printing process E is performed using a data printing/storing unit 80. The data printing/storing unit 80 connects data floppy disk drives 81 and 82.

Figure 10:
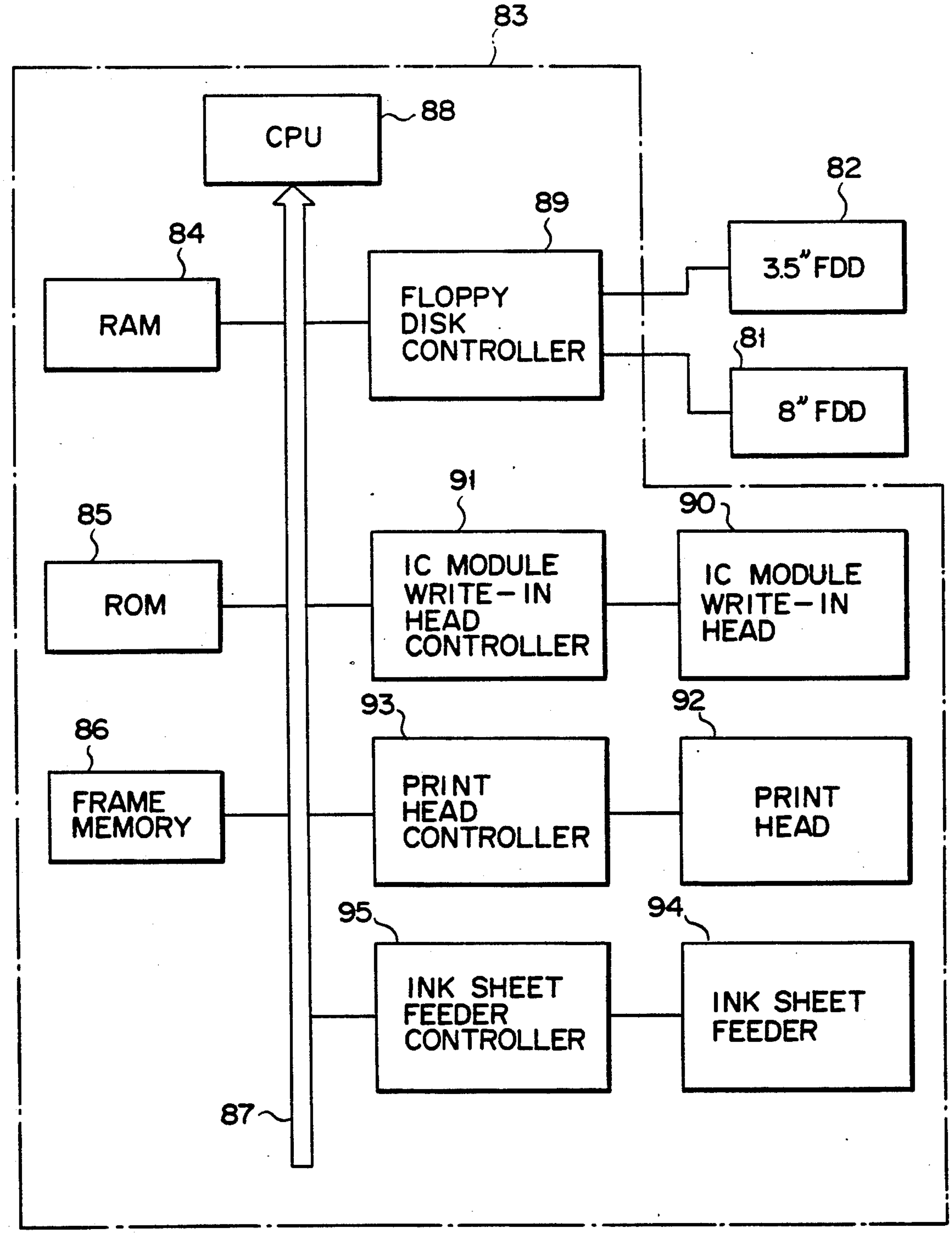
FIG. 10 is a block diagram showing an arrangement of a control section of a data printing storage device.

FIG. 10 shows a control section 83 in the data printing/storing unit 80 and the data floppy disk drives 81 and 82.

In the control section 83, a RAM 84, a ROM 85, and a frame memory 86 are connected to a CPU 88 through a bus 87. A floppy disk controller 89 connected to the data floppy disk drives 81 and 82 and an IC module write-in head controller 91 connected to an IC module write-in head 90 are connected to the CPU 88 through the bus 87.

A print head controller 93 connected to a print head 92, and an ink sheet feeder controller 95 connected to an ink sheet feeder 94 are also connected to the CPU 88.

The data floppy disk drive 81 receives an 8" floppy disk drive, and the data floppy disk drive 82 receives a 3.5" floppy disk.

The data printing/storing unit 80 has a printer function and prints surface printing data edited in the data editing process C on the white card 79. The data printing/storing unit 80 causes the IC module 78 to store employee data stored in the data floppy disk 25 in the data storage process B.

In the data editing process C of the manufacturing method consisting of the above processes, when image data coincides with employee data and data synthesis processing is completed, the data editing computer 26 sends the image and employee data to the data write-in unit 71.

The data write-in unit 71 causes the surface printing floppy disk 72 to store the synthesized image and employee data. The surface printing floppy disk 72 is inserted into the data floppy disk drive 81.

In the white card forming process D, the white polyvinyl chloride sheets 73, 75, and 77 are pressed, and at the same time, the IC module 78 is inserted into the holes 74 and 76 to form the white card 79. This white card 79 is set in the data printing/storing unit 80.

In the data printing/storing process E, the surface printing floppy disk 72 is inserted into the data floppy disk drive unit 81, the data floppy disk 25 is inserted into the data floppy disk drive 82, and the white card 79 is set. The data printing/storing apparatus 80 reads out surface printing data from the surface printing floppy disk 72 and prints it on the white card 79. The data printing/storing unit 80 reads out employee data from the data floppy disk 25 and stores it in the IC module 78.

As a result, an IC card 96 with a photograph can be formed.

In the third embodiment, the desired image and employee data are read out and synthesized under the control of the computer, and the surface printing data consisting of a desired employee are printed on the white card 79. At the same time, this employee data is stored in the IC module 78.

As compared with the conventional method requiring formation of a photograph register and adhesion of a photograph, the card manufacturing operations can be greatly facilitated. No operation errors between the image data and the employee data occur in collation between portraits and employee data.

In addition, errors in employee data inputs can be greatly reduced, and a card can be manufactured by one operator who operates the data input personal computer 4 and the data editing computer 26.

Figure 11:
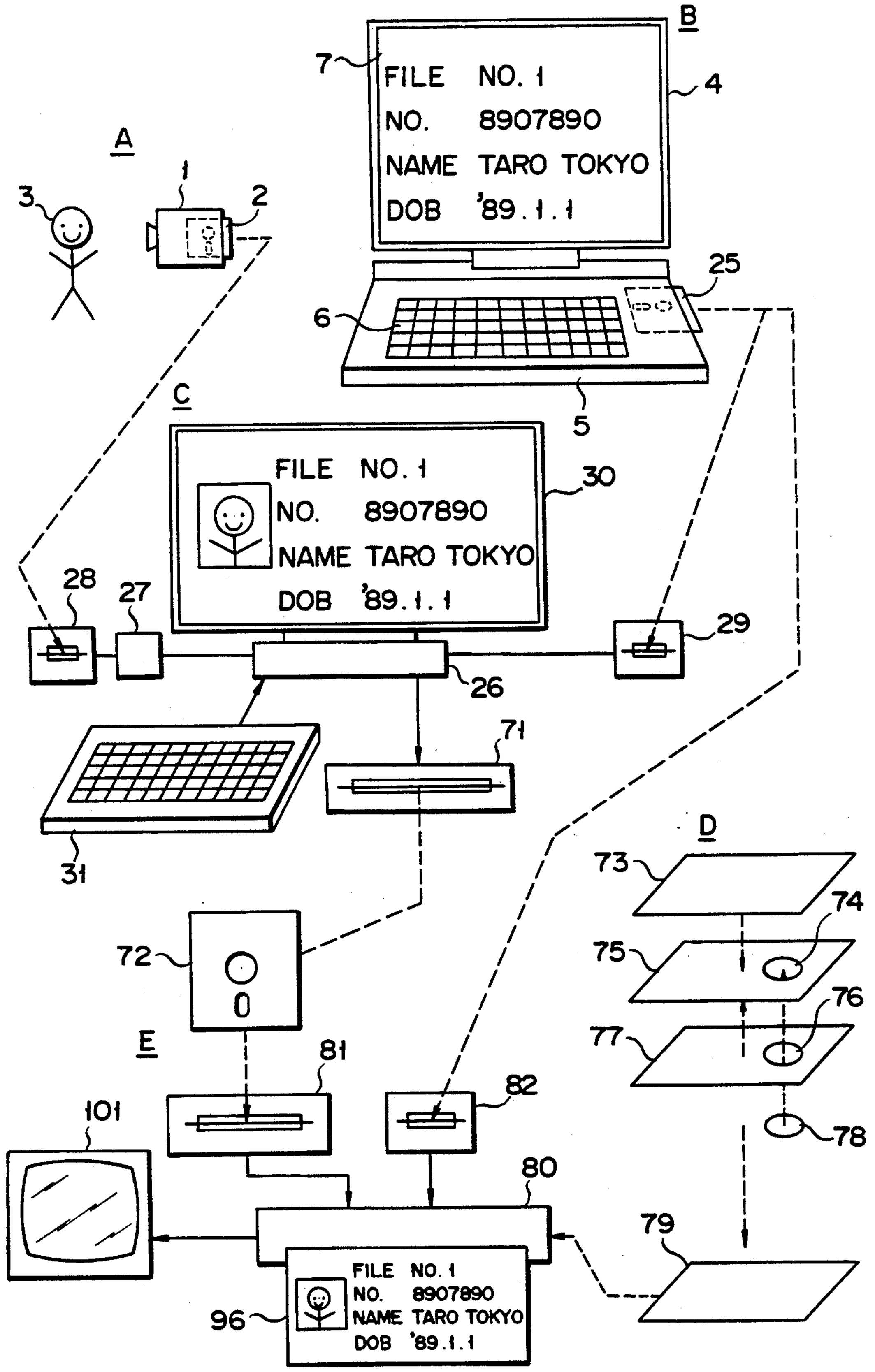
FIG. 11 is a block diagram showing a manufacturing process according to the fourth embodiment of the present invention.

The fourth embodiment of the present invention will be described with reference to FIG. 11. The same reference numerals as in the first to third embodiments denote the same parts in the fourth embodiment, and a detailed description thereof will be omitted.

This card manufacturing method consists of a photographing process A, a data storage process B, a data editing process C, a card forming process D, and a data write-in process E.

In the data write-in process E, a data printing/storing unit 80 is connected to a display unit 101. The data printing/storing unit 80 has a function of storing employee data stored in the data storage process B in an IC module 78, reading out the employee data from the IC module 78, and displaying the readout data on the display unit 101. The data printing/storing unit 80 has a function of printing on a white card 79 surface printing data corresponding to the employee data displayed on the display unit 101.

According to the fourth embodiment, in addition to the effect of the third embodiment, a correspondence between the surface printing data and the employee data can be checked. In addition, data editing operations which require a longer time than other processes can be performed independently of the manufacturing process, thereby reducing the manufacturing time.

In the data editing process C, employee data corresponding to the employee number "8907890" may be read out from the data floppy disk drive 29 and the film number of the image data floppy disk may also be read out from the image data readout unit 28. The readout data may be synthesized, and the synthesized data may be displayed on the display unit 101.

Figure 12A:
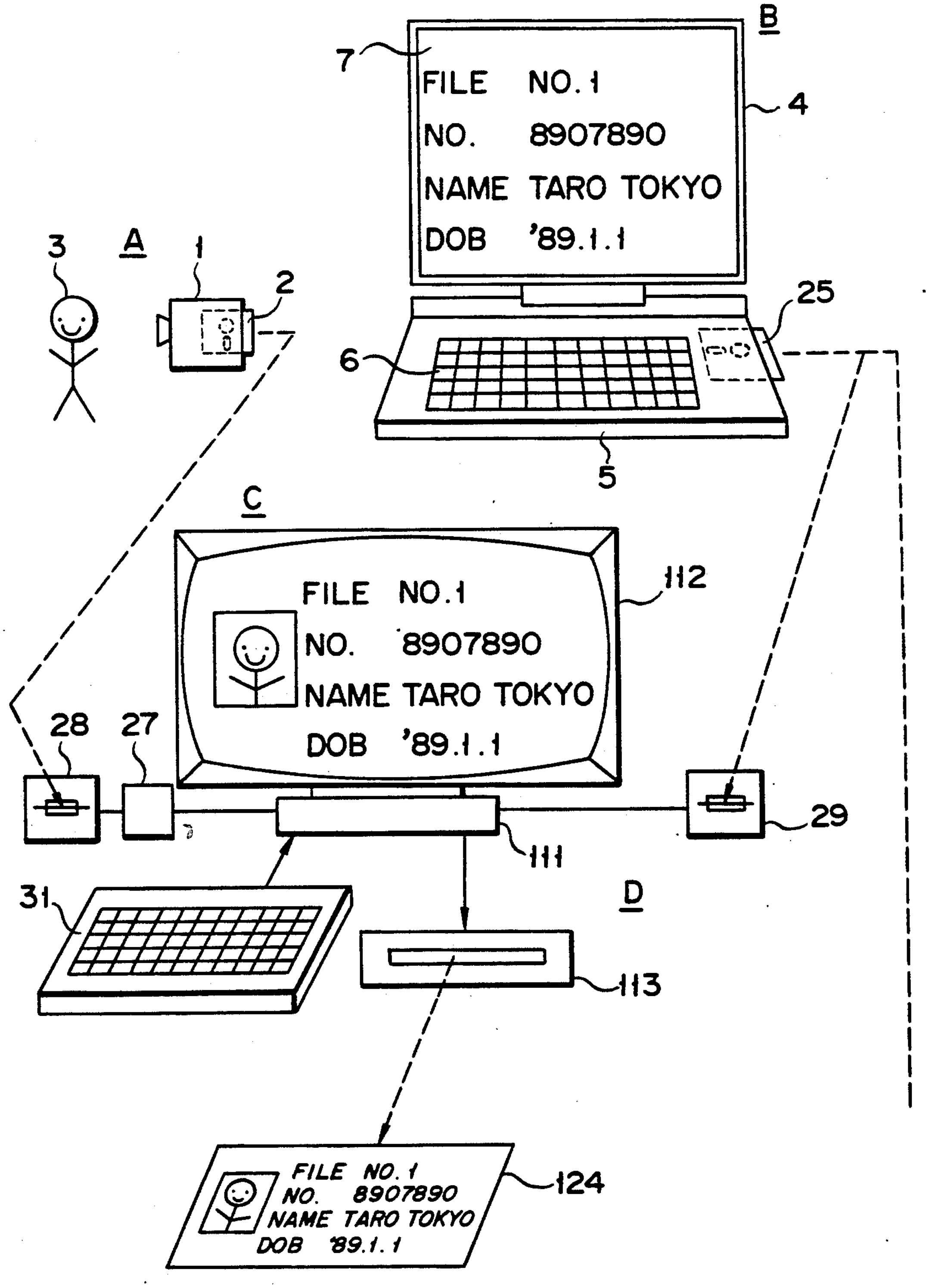
FIGS. 12*a* and 12*b* are views showing a manufacturing process according to the fifth embodiment of the present invention.
Figure 12B:
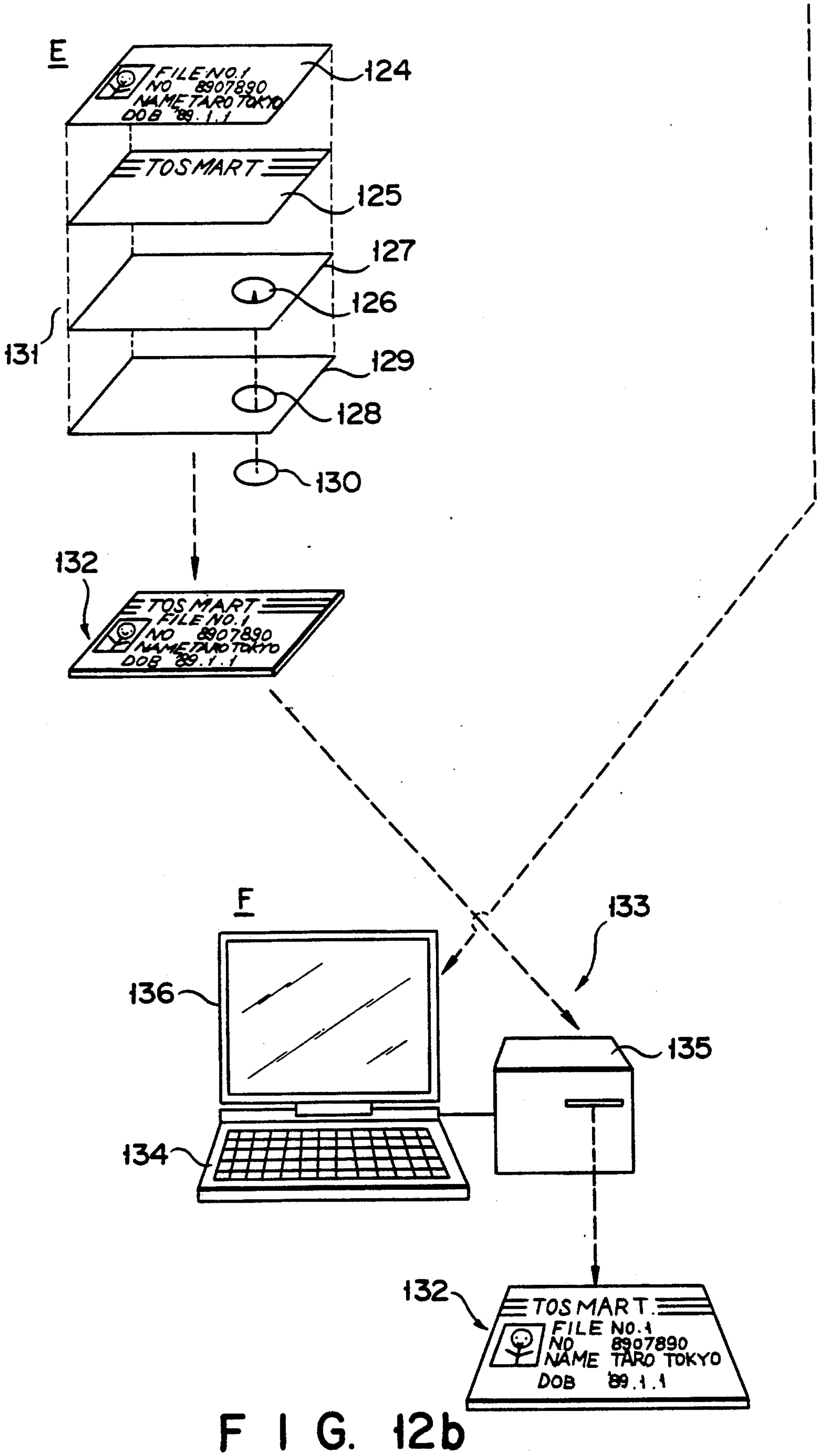

The fifth embodiment of the present invention will be described with reference to FIGS. 12*a* and 12*b*. The same reference numerals as in the previous embodiments denote the same parts in the fifth embodiment, and a detailed description thereof will be omitted.

A card manufacturing method of this embodiment consists of a photographing process A, a data storage process B, a data editing process C, a printing process D, a card forming process E, and a data write-in process F.

The data editing process C is performed using a data editing computer 111. The data editing computer 111 is connected to an image data readout unit 28 through an A/D converter 27. The data editing computer 111 is also connected to a data floppy disk drive 29, a CRT display unit 112, and a keyboard 31.

The data editing computer 111 is connected to a printer 113 used in the printing process D.

The data editing computer 111 has the same functions as those (FIG. 2) of the data input personal computer 4 and the data editing computer 26.

The data editing computer 111 receives each image data from the image data readout unit 28 and each employee data from the data floppy disk drive 29, and displays these image and employee data on the CRT display unit 112.

The data editing computer 111 synthesizes the image and employee data and generates print data.

Figure 13:
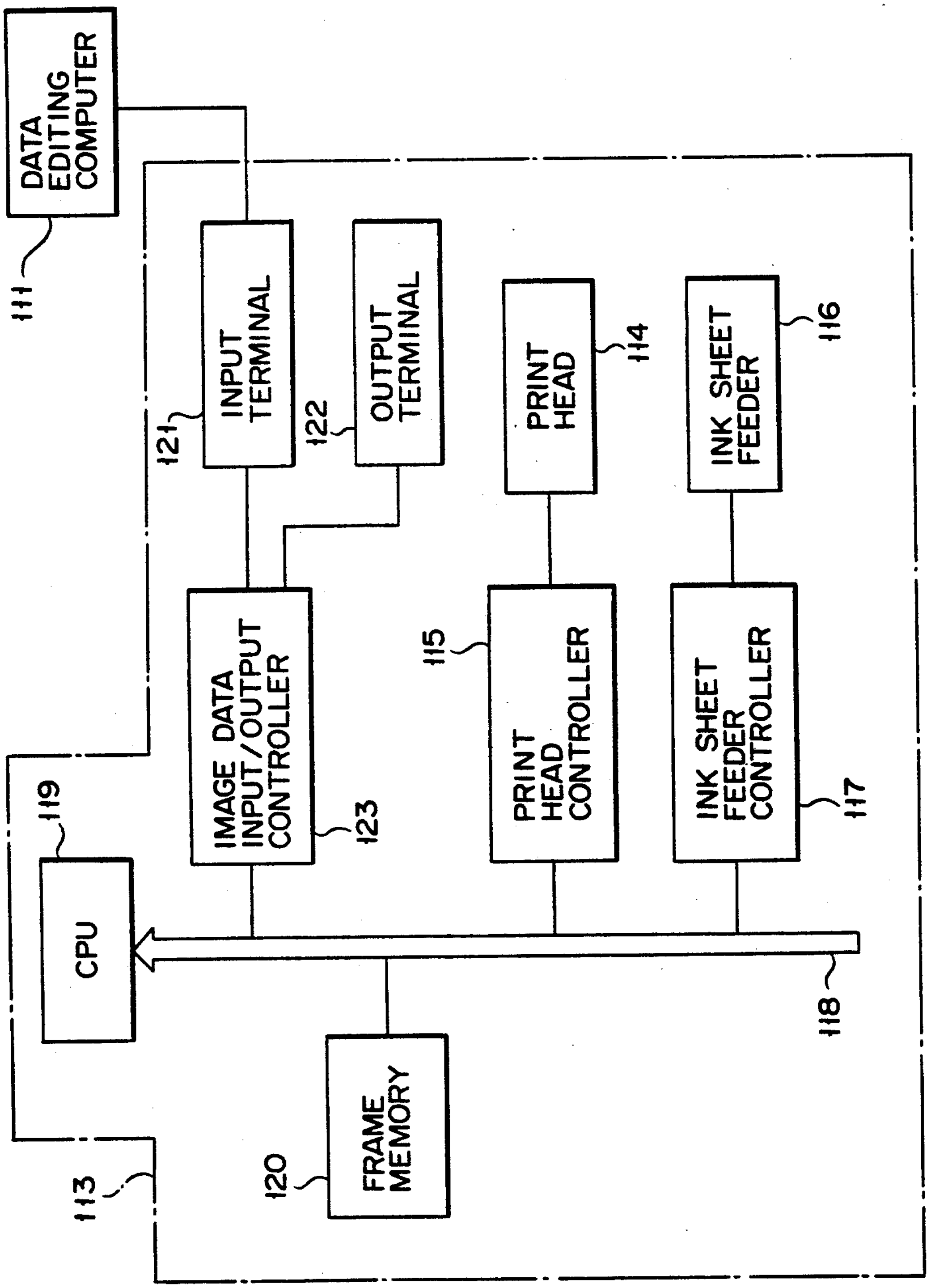
FIG. 13 is a functional block diagram of a printer.

FIG. 13 is a functional block diagram of the printer 113.

A print head 114 and a print head controller 115, an ink sheet feeder 116, and an ink sheet feeder controller 117 are connected to a CPU 119 through a bus 118.

A frame memory 120, and an image data input/output controller 123 connected to input and output terminals 121 and 122 are connected to the CPU 119 through the bus 118.

The printer 113 employs a sublime dye heat transfer line printing scheme. The printer 113 combines Y, M and C components (Yellow, Magenta, and Cyanine) to set a desired gray scale level.

The printer 113 comprises input terminals corresponding to a standard NTSC composite video signal, a Y/C separation composite video signal, an RGB-TTL signal, an RGB-analog signal, and a parallel data interface.

The printer 113 comprises output terminals corresponding to a standard NTSC composite video signal, a Y/C separation composite video signal, an RGB-TTL signal, and an RGB-analog signal.

The printer 113 is sent the generated print data from the data editing computer 111.

The printer 113 has the CPU 119 independent from the data editing computer 111, and data processing by the data editing computer 111 is performed without interruption by data processing by the printer 113.

In the printing process D, the printer 113 transfers the print data to a transparent polyvinyl chloride sheet 124, thus printing the print data thereon.

Note that the print data is printed on the lower surface of the transparent polyvinyl chloride sheet 124 and can be visually recognized from the upper surface of the transparent polyvinyl chloride sheet 124 through the transparent polyvinyl chloride sheet 124.

In the card forming process E, the transparent polyvinyl chloride sheet 124 having data printed by the printer 113, a white polyvinyl chloride sheet 125 having common characters, symbols and decorative lines, a white polyvinyl chloride sheet 127 having a hole 126, and a transparent polyvinyl chloride sheet 129 having a hole 128 are pressed while an IC module 130 is inserted in the holes 126 and 128.

The transparent polyvinyl chloride sheet 124 is bonded to a card body 131 consisting of three other sheets 125, 127, and 129, and the print data are synthesized with common card design in a desired layout. Therefore, an IC card 132 having the four sheets 124, 125, 127, and 129 as base materials is formed.

The data write-in process F is performed using a data write-in unit 133. The data write-in unit 133 comprises a data write-in personal computer 134 and a card insertion unit 135.

The data write-in unit 133 inserts the IC card 132 prepared in the card forming process E into the card insertion unit 13 and inserts into the data write-in personal computer 134 a data floppy disk 25 which stores each employee data in the data storage process B.

The data write-in unit 133 reads out from the data floppy disk 25 the employee data corresponding to the IC card 132 inserted into the card insertion unit 135. The readout employee data is displayed on, e.g., a display unit 136 and is stored in the IC module 13 incorporated in the IC card 132.

In the data editing process C of the manufacturing method consisting of the above processes, when data is input from the keyboard 31, the data editing computer 111 reads out image and employ data as in the previous embodiments and displays the readout data on the CRT display unit 112.

When the image and employee data displayed on the CRT display unit 112 do not coincide with each other, the data editing computer 111 judges the continuation (step a8), as described with reference to FIG. 5. The data editing computer 111 selects and updates the data read out from the image data readout unit 28 and the data floppy disk drive 29.

When the image and employee data coincide with each other, the data editing computer 111 sends both the data as print data to the printer 113.

In the printing process D, the print data is transferred to a predetermined position on the lower surface of the transparent polyvinyl chloride sheet 124 by the printer 113 and is thus printed out.

In the card forming process E, the transparent polyvinyl chloride sheet 124, the white polyvinyl chloride sheets 125 and 127, and the transparent polyvinyl chloride sheet 129 are pressed, and at the same time, the IC module 130 is inserted into the holes 126 and 128. The transparent polyvinyl chloride sheet 124 is formed integrally with the card body 131 consisting of three other sheets 125, 127, and 129.

At this time, the print data printed on the transparent polyvinyl chloride sheet 124 is combined with the common card design drawn on the next white polyvinyl chloride sheet 125. The IC card 132 is thus formed, and the synthesized print data and the common card design can be visually observed through the transparent polyvinyl chloride sheet 124.

The IC card 132 is fed to the data write-in process F. The IC card 132 is inserted and set in the card insertion unit 135 in the data write-in unit 133. In this data write-in process F, the data floppy disk 25 is inserted into the data write-in personal computer 134.

The data write-in unit 133 reads out from the data floppy disk 25 to the display unit 136 the employee data corresponding to the print data written in the IC card 132. The data write-in unit 133 sends the employee data to the card insertion unit 135 and writes it in the IC module 130 incorporated in the IC card 132.

As a result, the IC card 132 having the specific employee data stored therein and a portrait is obtained.

In this fifth embodiment, the image data representing the portrait of each employee is stored, and employee data of each employee is also stored. These image and employee data are synthesized in a one-to-one correspondence to generate the print data. In addition, the print data is printed on the transparent polyvinyl chloride sheet 124, and the sheet 124 is formed integrally with three other sheets 125, 127, and 129 constituting the uppermost layer of the IC card.

The print data printed on the transparent polyvinyl chloride sheet 124 is synthesized with the common card design drawn on the white polyvinyl chloride sheet 125 next to the sheet 124 to obtain final design, thereby forming the IC card 132. The employee data is then stored in the IC module 130 incorporated in the card body 131.

The operations for forming an IC card with a photograph can be greatly facilitated, and the image data is not erroneously matched with the employee data. The errors in employee data inputs can be greatly reduced. An IC card can be formed by one operator who operates both the data input personal computer 4 and the data editing computer 111.

More specifically, formation of the photograph table, collation and adhesion of photographs, and data write access, all which are required in the conventional apparatus, can be eliminated. Five or six operators are required to form 200 IC cards per day with the conventional apparatus. According to the above embodiments of the present invention, formation of the photograph registers, and collation and adhesion of photographs can be omitted, thus greatly reducing labor.

Figure 14A:
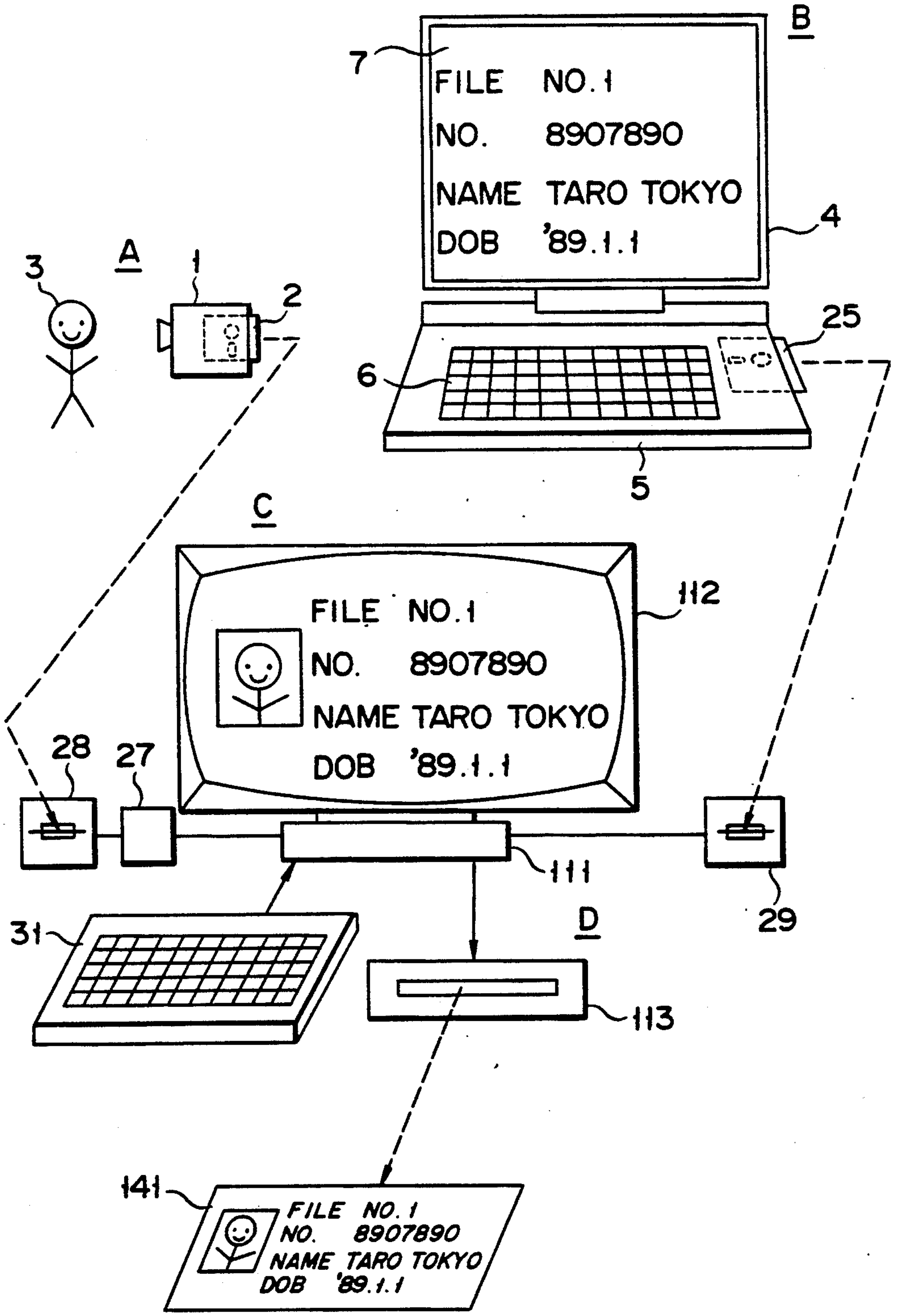
FIGS. 14*a* and 14*b* are views showing a manufacturing process according to the sixth embodiment of the present invention.
Figure 14B:
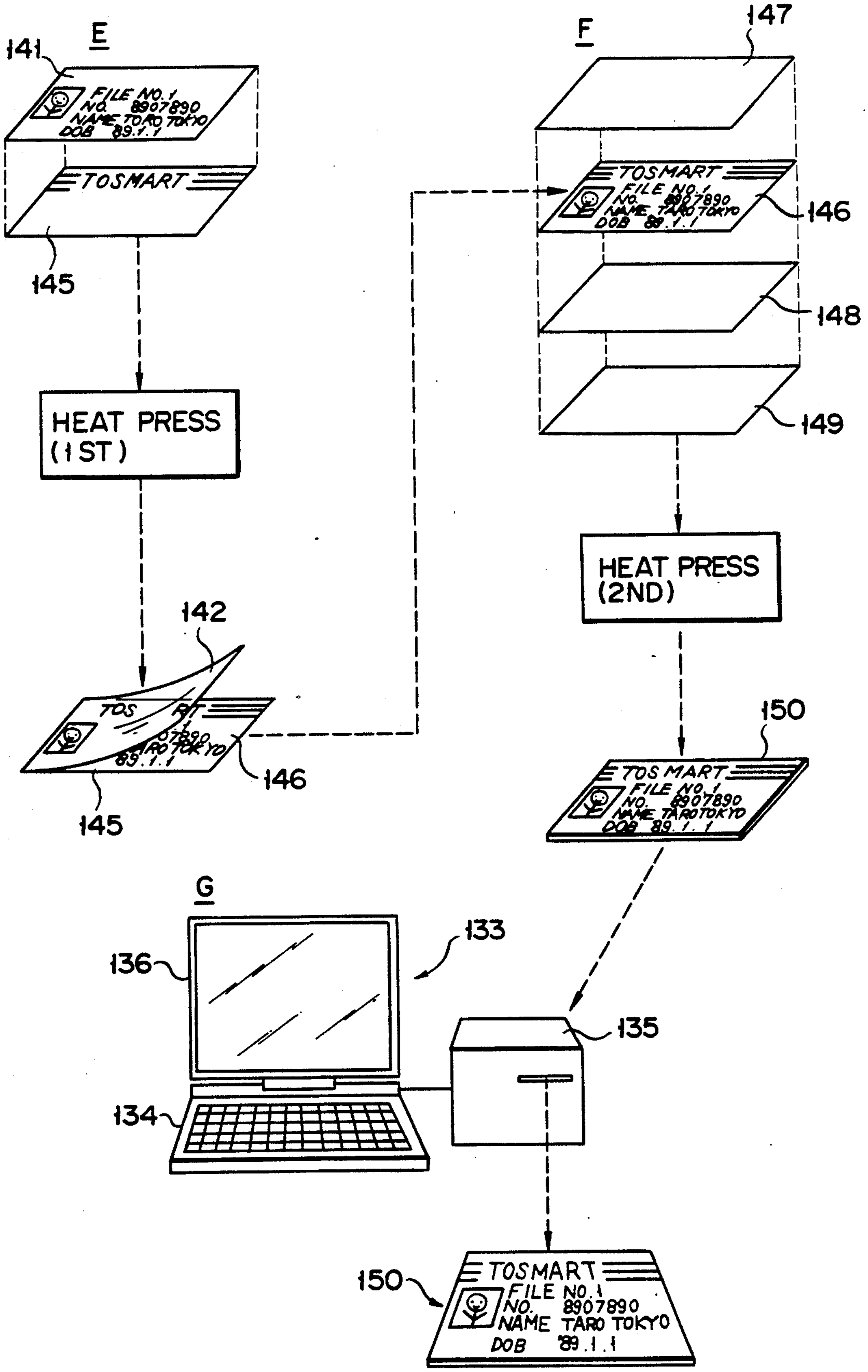

The sixth embodiment of the present invention will be described with reference to FIGS. 14*a* and 14*b*. The same reference numerals as in the previous embodiments denote the same parts in the sixth embodiment, and a detailed description thereof will be omitted.

A card manufacturing method of this embodiment consists of a photographing process A, a data storage process B, a data editing process C, a printing process D, an identification card forming process E, and a card forming process F.

The data editing process C is performed using a data editing computer 111. The data editing computer 111 is connected to an image data readout unit 28 through an A/D converter 27. The data editing computer 111 also connects a data floppy disk drive 29, a CRT display unit 112, and a keyboard 31.

The data editing computer 111 is connected to a printer 113 used in the printing process D.

The data editing computer 111 receives each image data from the image data readout unit 28 and each employee data from the data floppy disk drive 29, and displays these image and employee data on the CRT display unit 112.

The data editing computer 111 synthesizes the image and employee data and generates print data. The data editing computer 111 sends the generated print data to the printer 113.

In the printing process D, the printer 113 prints out the print data on a transfer sheet 141.

Figure 15:
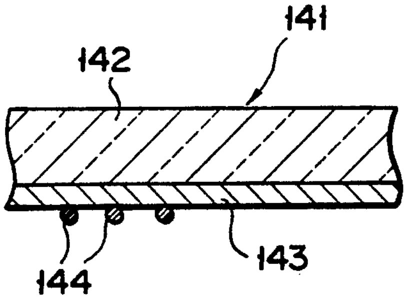
FIG. 15 is a partial sectional view of a transfer sheet.

As shown in FIG. 15, the transfer sheet 141 has a multilayered structure consisting of a transparent PET (polyethylene terephthalate) sheet 142 and a dye applying layer 143 formed on one surface of the transparent sheet 142 and having a uniform thickness. Thermosetting inks 144 for printing print data are applied to the dye applying layer 143 upon print-out at the printer 113.

The following sublime dyes can be used in the inks 144. The inks 144 contain organic dyes applied to fibers by an appropriate dyeing method. Examples of the dye are an azo dye, an anthraquinone dye, an indigoid dye, a sulfur dye, and a triphenylmethane dye.

In the identification card forming process E, the transfer sheet 141 on which print data is printed by the printer 113 is overlaid on a print sheet 145 consisting of white polyvinyl chloride and printed with common card characters and symbols and decorative lines. The surface of the transfer sheet 141 having the dye applying layer 143 faces the print sheet 145, and the inks 144 are brought into contact with the print sheet 145.

The transfer sheet 141 and the print sheet 145 are performed first heat-press. The dye applying layer 143 and the inks 144 are heated and welded to the print sheet 145. The dye applying layer 143 and the inks 144 are separated from the transparent sheet 142 and are transferred to a predetermined position on the print sheet 145. The print data consisting of the inks 144 are synthesized with the common card design and are applied to the print sheet 145.

The transparent sheet 142 is separated from the dye applying layer 143 and the inks 144 and is then separated from the print sheet 145 while the dye applying layer 143 and the inks 144 are left on the print sheet 145. Therefore, an identification sheet 146 having the print data and the common card design thereon is obtained.

In the card forming process F, the identification sheet 146, a transparent polyvinyl chloride sheet 147, a white polyvinyl chloride sheet 148, and a transparent polyvinyl chloride sheet 149 are overlaid on each other while a data storage medium such as an IC module is clamped therein. The four sheets 146 to 149 are bonded by second heat-press, and an IC card 150 having the four sheets 146 to 149 as base materials is formed.

The data write-in process G is performed using a data write-in unit 133. The data write-in unit 133 comprises a data write-in personal computer 134 and a card insertion unit 135.

The data write-in unit 133 inserts the IC card 132 formed in the card forming process F into the card insertion unit 135 and inserts into the data write-in personal computer 134 a data floppy disc 25 which stores the employee data in the data storage process B.

The data write-in unit 133 reads out from the data floppy disk 25 the employee data corresponding to the IC card 150 inserted into the card insertion unit 135. The readout data is displayed on, e.g., a display unit 136 and is stored in the IC module incorporated in the IC card 150.

The IC module is not illustrated.

In the data editing process C of the manufacturing method consisting of the above processes, when data is input from the keyboard 31, the data editing computer 111 reads out image and employee data, and the readout data are displayed on the CRT display unit 112.

When the image and employee data displayed on the CRT display unit 112 do not coincide with each other, the data editing computer 111 judges continuation (step a8) described with reference to FIG. 5. The data editing computer 111 selects and updates various data read out from the image data readout unit 28 and the data floppy disk drive 29.

When the image and employee data coincide with each other the data editing computer 111 sends both the data to the printer 113.

In the printing process D, the print data is printed out by the printer 113 on the transfer sheet 141 having the transparent PET sheet 142.

The inks 144 are applied to the transparent sheet 142 through the dye applying layer 143.

In the identification sheet forming process E, the transfer sheet 141 printed with the print data and the print sheet 145 consisting of a white polyvinyl chloride sheet and having common card design thereon are performed the first heat-press.

The inks 144 of the transfer sheet 141 are thermally welded and transferred to the print sheet 145, and the print data is printed at a predetermined position on the print sheet 145. The transparent sheet 142 is peeled, so that the print data and the common card design can be formed on the identification sheet 146.

In the card forming process F, the identification sheet 146, the transparent polyvinyl chloride sheet 147, the white polyvinyl chloride sheet 148, and the transparent polyvinyl chloride sheet 149 are bonded by heat-press to form an integral body. In this case, the identification sheet 146 serves as the second layer and is covered with the transparent polyvinyl chloride sheet 147 serving as the first layer, thus obtaining the IC card in which characters and a graphic pattern printed on the identification sheet 146 can be seen through the transparent polyvinyl chloride sheet 147.

The IC card 15 is conveyed to the data write process G. The IC card 150 is inserted and set in the card insertion unit 135 in the data write-in unit 133. In the data write-in process G, the data floppy disk 25 is inserted into the data write personal computer 134.

The data write-in unit 133 reads out from the data floppy disk 25 the employee data corresponding to the print data written in the IC card 150, and the readout data is sent to the display unit 136. The data write-in unit 133 sends the employee data to the card insertion unit 135, and the employee data is stored in the IC module incorporated in the IC card 150.

The IC card 150 having a portrait of a specific employee is thus formed.

The same IC module 130 as in the fifth embodiment may be utilized to incorporate the IC module 130 in the IC card 150 in the same method as in the fifth embodiment.

In the sixth embodiment, the image data representing portraits of the respective employees are stored, and the individual employee data are also stored. The image data is caused to correspond to the employee data to generate the print data.

The print data is printed out on the transfer sheet 141 consisting of the PET transparent sheet 142 and the dye applying layer 143, and the inks 144 representing the print data are applied to the transparent sheet 142 through the dye applying layer 143.

The transfer sheet 141 and the print sheet 145 consisting of a white polyvinyl chloride are heat-pressed to transfer the inks 144 to the print sheet 145, and then the transparent sheet 14 is peeled to form the identification sheet 146 having the print data and the common card design in a predetermined layout.

The transparent polyvinyl chloride sheet 147, the white polyvinyl chloride sheet 148, and the transparent polyvinyl chloride sheet 149 are overlapped on each other by using the identification sheet 146 as the second sheet, and these four sheets 146 to 149 are secondary heat-pressed to obtain the IC card 150.

The operations for forming the IC card with photographs can be greatly facilitated, and the image data is not mismatched with the employee data. In addition, errors in employee data inputs can also be greatly reduced.

More specifically, formation of photograph registers and collation and adhesion of photographs, which are required in the conventional apparatus, can be eliminated, thereby greatly reducing labor.

The image data and the employee data must be synthesized to prepare the print data, the print data must be printed out, and preliminary pressing are required in this embodiment. These operations require a total of only two operators, i.e., a data editing computer operator and an operator for pressing.

Since a portrait of an employee is converted into image data, and the image data is transferred to the print sheet 145 upon its print-out on the transfer sheet 141, the portrait portion can be formed integrally with a base (i.e., the identification sheet 146 and the transparent polyvinyl chloride sheet 147) with high precision. Damage caused by differences in modulus of elasticity of different materials can be prevented.

The present invention is not limited to the particular embodiments described above. Various changes and modifications may be made without departing from the spirit and scope of the invention.

In each embodiment described above, the floppy disk camera 1 using a floppy disk as a recording medium is used to form a portrait of each employee. However, the present invention is not limited to this. For example, as shown in FIG. 1, an IC card camera 160 using an IC card as a recording medium can be used to form a portrait of an employee.

In this case, write-in/read-out units are required in order to reproduce the image taken by the IC card camera 160. Since the arrangement of the write-in/read-out units of an IC card camera is generally more simple than that of a floppy disk camera, the explanation as well as the drawings thereof ar omitted here.

Any other apparatus may be used if it provides the same effect as the floppy disk camera and the IC card camera.

The method of the present invention is not limited to the method of manufacturing an IC card.

The present invention is also applicable to all types of cards which have photographs and character data, and to the manufacture of ID cards.

The present invention is further applicable to the manufacture of all cards for displaying photographs and character data, and all other cards having data recording media such as IC modules and magnetic stripes.

In each embodiment, a material used as the card base is paper or plastics.

Examples of the plastics are polyvinyl chloride, an acrylic resin, an ABS (acrylonitrile-butadiene-styrene copolymer), and a liquid crystal polymer.

What is claimed is:

1. A method of manufacturing a card, comprising the steps of:

a first step of photographing objects and storing photographed objects as image data;

a second step of storing object data associated with the objects;

a third step of reading out, in combination, desired image data from the image data and part of the object data corresponding to the desired image data, and synthesizing the desired image data and the part of the object data;

a fourth step of printing out the synthesized data of the image data and the object data on a single transfer sheet;

a fifth step of combining the printed transfer sheet with a print sheet and, transferring the synthesized pattern from the transfer sheet to the print sheet which thereby serves as an identification sheet;

a sixth step of overlapping the identification sheet and sheets incorporating a data storage medium to form a card; and a seventh step of storing the object data in the data storage medium.

2. A method according to claim 1, wherein the fourth step comprises a step of printing out the synthesized image and object data on the transfer sheet having a transparent polyethylene terephthalate sheet and a dye applying layer for applying a dye.

3. A method according to claim 1, wherein the fourth step comprises a step of printing out the synthesized image and object data on transfer sheet by using a sublime dye.

4. A method according to claim 1, wherein the fourth step comprises a step of printing out the synthesized image and object data on a transfer sheet by using a dye consisting of a thermosetting ink.

5. A method according to claim 1, wherein the sixth step comprises a step of stacking the identification sheet with at least two sheets, the identification sheet serving as a second layer.

6. A method according to claim 1, wherein the seventh step comprises a step of storing the object data in an IC module.

7. A method according to claim 1, wherein the seventh step comprises a step of displaying the image data and the object data on a display unit.

8. A method of manufacturing a card, comprising the steps of:

a first step of photographing objects and storing photographed objects as image data;

a second step of storing object data associated with the objects;

a third step of reading out, in combination, desired image data from the image data and part of the object data corresponding to the desired image data, and synthesizing the desired image data and the part of the object data;

a fourth step of printing out the synthesized data of the image data and the object data on a single transfer sheet;

a fifth step of combining the printed transfer sheet with a print sheet and, transferring the synthesized pattern from the transfer sheet to the print sheet which thereby serves as an identification sheet; and a sixth step of stacking the identification sheet with other sheets to form a card.

9. A method according to any one of claims 1 or 8, wherein the first step comprises a step photographing objects by a floppy disk camera.

10. A method according to any one of claims 1 or 8, wherein the first step comprises a step of photographing objects by a IC card camera.

11. A method according to any one of claims 1 or 8, wherein the second step comprises the step of displaying each object on a display unit.

12. A method according to any one of claims 1 or 8, wherein the third step comprises a step of displaying the readout image and object data on a display unit.

13. A method according to claim 1, wherein the fifth step includes combining the printed transfer sheet with a print sheet drawn with a card pattern common to cards, so that a pattern of the image data and object data are synthesized with the card pattern, thus obtaining an identification sheet.

14. A method according to claim 8, wherein the fifth step includes combining the printed transfer sheet with a print sheet dawn with a card pattern common to cards, so that a pattern of the image data and object data are synthesized with the card pattern, thus obtaining an identification sheet.

* * * * *